US012716351B2

(12) United States Patent
Zhang et al.

(10) Patent No.: US 12,716,351 B2
(45) Date of Patent: Aug. 25, 2026

(54) ADAPTIVE NON-DISPERSIVE AND DIRECTION-DEPENDENT ATTENUATION OF ARTIFACTS IN SEISMIC WAVE PROPAGATION

(71) Applicant: ARAMCO SERVICES COMPANY, Houston, TX (US)

(72) Inventors: Houzhu Zhang, Houston, TX (US); Hong Liang, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 557 days.

(21) Appl. No.: 18/345,983

(22) Filed: Jun. 30, 2023

(65) Prior Publication Data

US 2025/0003327 A1 Jan. 2, 2025

(51) Int. Cl.
*E21B 47/022* (2012.01)
*E21B 7/04* (2006.01)
(Continued)

(52) U.S. Cl.
CPC .............. *E21B 47/022* (2013.01); *E21B 7/04* (2013.01); *E21B 47/0025* (2020.05);
(Continued)

(58) Field of Classification Search
None
See application file for complete search history.

(56) References Cited

U.S. PATENT DOCUMENTS 11,360,224 B2 6/2022 Tan et al.
2005/0043892 A1* 2/2005 Lichman ................ G01V 1/306 702/13
(Continued)

FOREIGN PATENT DOCUMENTS

CN 111257930 A 6/2020
CN 115453621 A 12/2022

OTHER PUBLICATIONS

Billette F. and Brandsberg-Dahl, S., "The BP 2004 velocity benchmark," B035, Eage 67th Conference & Exhibition—Madrid, Spain, Jun. 13-16, 2005, 4 pages.
(Continued)

*Primary Examiner* — Lina Cordero
(74) *Attorney, Agent, or Firm* — Osha Bergman Watanabe & Burton LLP

(57) ABSTRACT

Examples of methods and systems are disclosed. The methods may include obtaining seismic data associated with a subsurface region of interest, wherein the seismic data comprises a plurality of time-space waveforms. The methods may also include determining a plurality of mechanical parameters corresponding to a formation of the subsurface region based, at least in part, on the plurality of time-space waveforms. The methods may further include generating a filtering region based on an artifact identified in the plurality of time-space waveforms. The methods may still further include determining a plurality of attenuation parameters based, at least in part, on the filtering region, the attenuation parameters being configured to attenuate the artifact. The methods may further include filtering the time-space waveforms to generate a plurality of filtered time-space waveforms. The method may still further include generating a seismic image of the subsurface region using the plurality of filtered time-space waveforms.

15 Claims, 12 Drawing Sheets

(51) Int. Cl.

| | |
|---|---|
| ***E21B 47/002*** | (2012.01) |
| ***G01V 1/30*** | (2006.01) |
| ***G01V 1/36*** | (2006.01) |
| ***G01V 1/50*** | (2006.01) |

(52) U.S. Cl.

CPC .............. *G01V 1/306* (2013.01); *G01V 1/364* (2013.01); *G01V 1/50* (2013.01); *G01V 2210/64* (2013.01)

(56) References Cited

U.S. PATENT DOCUMENTS

| | | | | |
|---|---|---|---|---|
| 2011/0134722 | A1* | 6/2011 | Virgilio | G01V 1/30 367/75 |
| 2014/0039799 | A1* | 2/2014 | Krohn | G01V 1/368 702/14 |
| 2016/0131781 | A1 | 5/2016 | Sun et al. | |
| 2016/0320509 | A1* | 11/2016 | Almuhaidib | G01V 1/306 |
| 2019/0302292 | A1* | 10/2019 | Xie | G01V 1/282 |
| 2021/0247534 | A1 | 8/2021 | Bø | |
| 2023/0140168 | A1* | 5/2023 | Sun | G01V 1/345 702/16 |

OTHER PUBLICATIONS

Carcione et al., "Wave propagation in a linear viscoelastic medium," Geophysical Journal, 95, pp. 597-611, Jun. 14, 1988, 15 pages.

Cerveny et al., "Quality factor Q in dissipative anisotropic media," Geophysics, vol. 73, No. 4, pp. T63-T75, Jul. 8, 2008, 13 pages.

Chen, Y. and Y. Huang, "Use Q-RTM to image beneath gas hydrates in Alaminos Canyon, Gulf of Mexico," SEG Denver 2010 Annual Meeting., Society of Exploration Geophysicists, pp. 3165-3170, 6 pages.

Kosloff, R. and Kosloff, D., "Absorbing boundaries for wave propagation problems," Journal of Computational Physics, 63, pp. 363-376, Apr. 1, 1985, 14 pages.

Kumar, D. and Brandsberg-Dahl, S., "Seismic modelling in Attenuating media," 5th Conference & Exposition on Petroleum Geophysics, Hyderabad-2004, India, pp. 1006-1010, 5 pages.

Raji, "Seismic and petrophysical studies on seismic wave attenuation," PhD Thesis, University of Liverpool, Jul. 2012, 191 pages.

Sun, "Seismic modeling and imaging in complex media using low-rank approximation," Dissertation, The University of Texas at Austin, Dec. 2016, 197 pages.

Xie et al., "Compensating for visco-acoustic effects in TTI reverse time migration," SEG 2015 New Orleans Annual Meeting., Society of Exploration Geophysicists, pp. 3996-4000, 6 pages.

Xu, T. and McMechan, G.A., "Composite memory variables for viscoelastic synthetic seismograms," Geophysical Journal International, 121, pp. 634-639, Oct. 8, 1994, 6 pages.

Yang, J. and H. Zhu, "Viscoacoustic reverse time migration using a time-domain complex valued wave equation," Geophysics, vol. 83, No. 6, pp. S505-S519, Oct. 8, 2018, 15 pages.

Zhu, T. and J. Harris, "Modeling acoustic wave propagation in heterogeneous attenuating media using decoupled fractional Laplacians," Geophysics, vol. 79, No. 3, pp. T105-T116, Mar. 12, 2014, 12 pages.

Zhu, "Numerical simulation of seismic wave propagation in viscoelasticanisotropic media using frequency-independent Q wave equation," Geophysics, vol. 82, No. 4, pp. WA1-WA10, Apr. 21, 2017, 10 pages.

International Search Report issued for corresponding international patent application No. PCT/US2024/035245, mailed Oct. 11, 2024 (5 pages).

Written Opinion issued for corresponding international patent application No. PCT/US2024/035245, mailed Oct. 11, 2024 (9 pages).

* cited by examiner

ADAPTIVE NON-DISPERSIVE AND DIRECTION-DEPENDENT ATTENUATION OF ARTIFACTS IN SEISMIC WAVE PROPAGATION

BACKGROUND

In the oil and gas industry, wells are drilled into the surface of the Earth to access and produce hydrocarbons located in hydrocarbon reservoirs. The locations of hydrocarbon reservoirs are often determined by performing seismic surveys. Seismic surveys are used to image the subsurface and these images may be analyzed when looking for hydrocarbon reservoirs. Seismic surveys gather seismic data using, for example, sources that emit seismic waves and receivers that record the ground motion due to the seismic waves traveling through the subsurface.

Seismic data can be processed to form an image of the subsurface. Typical processing of seismic data includes a sequence of steps designed to correct for near-surface effects, attenuate noise, compensate of irregularities in the seismic survey geometry, calculate a seismic velocity model, locate reflectors in the subterranean region, calculate a plurality of seismic attributes to characterize the subterranean region, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method. The method includes obtaining seismic data associated with a subsurface region of interest, where the seismic data comprises a plurality of time-space waveforms. The method also includes determining a plurality of mechanical parameters corresponding to a formation of the subsurface region based, at least in part, on the plurality of time-space waveforms. The method further includes generating a filtering region based on an artifact identified in the plurality of time-space waveforms. The method still further includes determining a plurality of attenuation parameters based, at least in part, on the filtering region, the attenuation parameters being configured to attenuate the artifact. The method further includes filtering the time-space waveforms based, at least in part, on the plurality of mechanical parameters and the plurality of attenuation parameters to generate a plurality of filtered time-space waveforms. The method still further includes generating a seismic image of the subsurface region using the plurality of filtered time-space waveforms.

In general, in one aspect, embodiments disclosed herein relate to a system. The system includes a seismic acquisition system configured to record seismic data regarding a subsurface region of interest, where the seismic data comprises a plurality of time-space waveforms. The system also includes a seismic processor coupled to the seismic acquisition system and configured to obtain the seismic data associated with the subsurface region of interest. The seismic processor is also configured to determine a plurality of mechanical parameters corresponding to a formation of the subsurface region based, at least in part, on the plurality of time-space waveforms. The seismic processor is further configured to generate a filtering region based on an artifact identified in the plurality of time-space waveforms. The seismic processor is still further configured to determine a plurality of attenuation parameters based, at least in part, on the filtering region, the attenuation parameters being configured to attenuate the artifact. The seismic processor is further configured to filter the time-space waveforms based, at least in part, on the plurality of mechanical parameters and the plurality of attenuation parameters to generate a plurality of filtered time-space waveforms. The seismic processor is further configured to generate a seismic image of the subsurface region using the plurality of filtered time-space waveforms.

It is intended that the subject matter of any of the embodiments described herein may be combined with other embodiments described separately, except where otherwise contradictory.

Other aspects and advantages of the claimed subject matter will be apparent from the following description and the appended claims.

DETAILED DESCRIPTION

Figure 1:
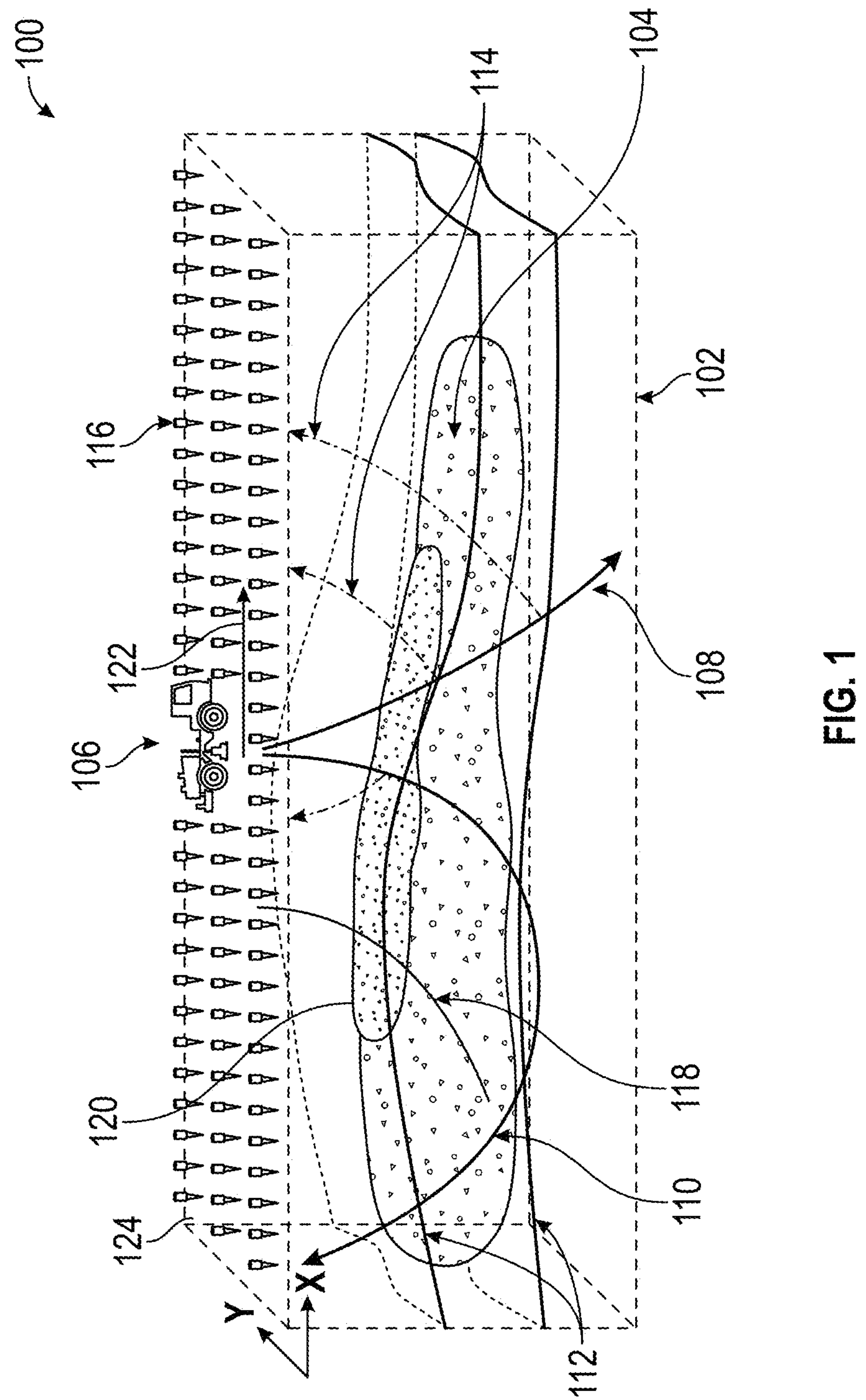
FIG. 1 shows a seismic acquisition system of a subsurface region of interest, according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-12, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic signal" includes reference to one or more of such seismic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In general, disclosed embodiments include systems and methods to attenuate unwanted reflections and refractions from certain types of geological bodies or geological boundaries in models of a subsurface. In some cases, it may be desirable to drill a wellbore into a hydrocarbon reservoir to produce the hydrocarbon to the surface. Such a wellbore may be a vertical wellbore or may be a horizontal wellbore constructed using geosteering drilling methods. A subsurface model may assist in locating potential drilling targets or in identifying the lateral extent of a hydrocarbon reservoir.

In seismic data interpretation, imaging and inversion are basic techniques in modeling the subsurface structure of a region of interest. These techniques are commonly iterative and build the subsurface model by portions or regions that are later integrated in a global model. If one region of the model has been built with low accuracy, simulations to construct the global model may be contaminated with unwanted interferences, or artifacts, degrading the quality of the resulting global model. Thus, processing techniques to attenuate the unwanted interferences may assist in constructing accurate subsurface models.

In order to model seismic attenuation in continuous media, wave propagation is commonly simulated using the viscoelastic wave equation. Numerical simulations based on the viscoelastic wave equation are closely related to the physics of seismic wave attenuation. However, in viscoelastic wave propagation attenuation and dispersion phenomena are not independent. Dispersion is often associated with mechanical parameters (such as wave propagation velocity) that are frequency-dependent, which also typically means that a change in amplitude translates into a change in phase. Changes in phase are difficult to treat in seismic data processing, in particular if seismic data is treated in the depth domain. In addition, because viscoelastic wave simulations may involve storing variables for a high number of time steps, they may easily become computationally expensive. Efficient processing techniques of low computational cost may assist in the investigation of the impact of certain portions or regions of a subsurface model during model building.

FIG. 1 shows a seismic acquisition system (100) of a subsurface region of interest (102), according to one or more embodiments. The subsurface region of interest (102) may contain a hydrocarbon deposit (120) that may form part of a hydrocarbon reservoir (104). The seismic acquisition system (100) may utilize a seismic source (106) that generates radiated seismic waves (108). The radiated seismic waves (108) may return to the surface as refracted seismic waves (110) or reflected seismic waves (114). Refracted seismic waves (110) and reflected seismic waves (114) may occur, for example, due to geological discontinuities (112). A geological discontinuity may be, for example, a plane or a surface that marks a change in physical or chemical characteristics in a geological structure.

At the surface, refracted seismic waves (110) and reflected seismic waves (114) may be detected by seismic receivers (116). Radiated seismic waves (110) that propagate from the seismic source (106) directly to the seismic receivers (116), known as direct seismic waves (122), are also detected by the seismic receivers (116).

In some embodiments, a seismic source (106) may be positioned at a location denoted $(x_s,y_s)$ where x and y represent orthogonal axes on the earth's surface above the subsurface region of interest (102). The seismic receivers (116) may be positioned at a plurality of seismic receiver locations denoted $(x_r,y_r)$, with the distance between each receiver and the source being termed "the source-receiver offset", or simply "the offset". Thus, the direct seismic waves (122), refracted seismic waves (110), and reflected seismic waves (114) generated by a single activation of the seismic source (106) may be represented in the axes $(x_s,y_s,x_r,y_r,t)$. The t-axis delimits the time sample at which the seismic acquisition system (100) activated the seismic source (106) and acquired the seismic data by the seismic receivers (116).

Seismic processing may reduce five-dimensional seismic data produced by a seismic acquisition system (100) to three-dimensional (x,y,t) seismic data by, for example, correcting the recorded time for the time of travel from the seismic source (106) to the seismic receiver (116) and summing ("stacking") samples over two horizontal space dimensions. Stacking of samples over a predetermined time interval may be performed as desired, for example, to improve the quality of the signals.

Seismic data may also refer to data acquired over different time intervals, such as, for example, in cases where seismic surveys are repeated to obtain time-lapse data. Seismic data may also be pre-processed data, e.g., arranging data in a "common shot gather" (CSG) domain, i.e., sorting waveforms as acquired by different receivers and having a single source location. The noted seismic data is not intended as limiting, and any other suitable seismic data is intended to fall within the scope of the present disclosure.

Figure 2:
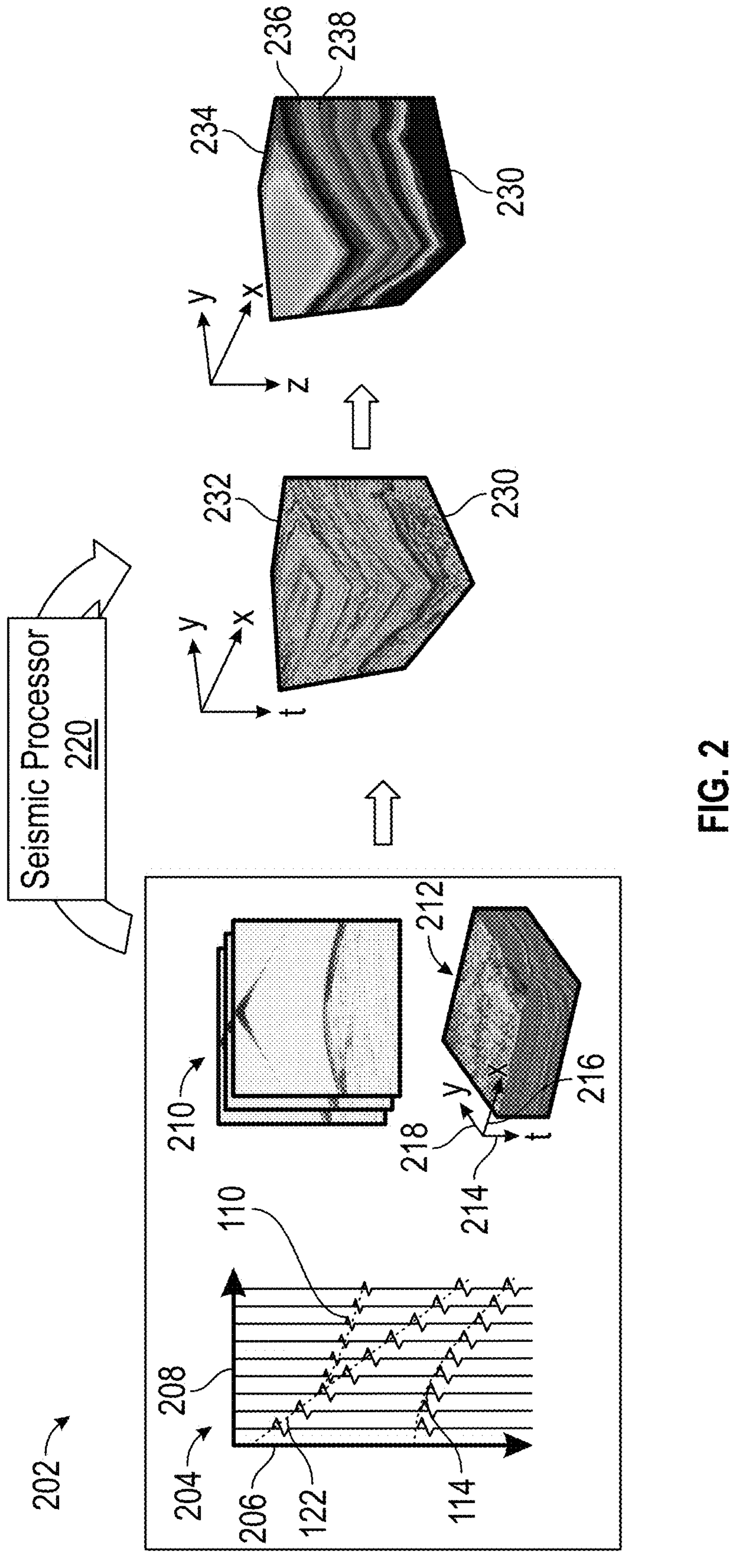
FIG. 2 shows examples of seismic data produced by a seismic acquisition system in accordance with one or more embodiments.

FIG. 2 shows examples of seismic data (202) produced by a seismic acquisition system (100) in accordance with one or more embodiments. An example of a CSG (204) illustrates the detection of direct seismic waves (122), refracted seismic waves (110), and reflected seismic waves (114) generated by a single activation of the seismic source (106) and recorded by a several colinear seismic receivers (116). Each seismic receiver (116) may record a time-series representing the amplitude of ground-motion at a sequence of discrete times. This time-series may be denoted or otherwise referred to as a "waveform".

In the CSG (204) shown in FIG. 2 the vertical axis represents the time scale (206) and the horizontal axis represents the offset (208). In some embodiments, direct seismic waves (122), refracted seismic waves (110), and reflected seismic waves (114) may be located in the CSG (204) by their arrival times, i.e., the times instants they are first detected by the seismic receivers (116). The location of a particular type of wave in seismic data (202) acquired in time and space, such as in CSG (204), may be termed as an "arrival". The CSG (204) illustrates how the different arrivals are detected at later times by the seismic receivers (116) that are farther from the seismic source (106).

In one or more embodiments, seismic data (202) acquired by a seismic acquisition system (100) may be arranged in a plurality of CSGs (210) to create a 3D seismic dataset. Alternatively, the seismic data may be represented as a "seismic volume" (212) consisting of a plurality of time-space waveforms with a time axis (214), a first spatial dimension (216), and a second spatial dimension (218), where the first spatial dimension (216) and second spatial dimension (218) are orthogonal and span the Earth's surface above the subsurface region of interest (102).

In some embodiments, seismic data (202) is processed by a seismic processor (220) to generate a seismic image (230). For example, a time-domain seismic image (232) may be generated using a process called seismic migration (also referred to as "migration" herein). In seismic migration, seismic events (e.g., reflections, refractions) recorded at the surface are relocated in either time or space to the location the event occurred in the subsurface. In some embodiments, migration may transform pre-processed shot gathers from a time-domain to a depth-domain seismic image (234). In a depth-domain seismic image (234), seismic events in a migrated shot gather may represent geological discontinuities (112) or "geological boundaries" (236, 238) in the subsurface. Various types of migration algorithms may be used in seismic imaging. For example, one type of migration algorithm corresponds to reverse time migration.

As illustrated in FIG. 2, processing of seismic data (202) may generate a seismic image (230) that may reveal the three-dimensional geometry of a subsurface region of interest (102). If a seismic image (230) indicates the presence of hydrocarbons in the subsurface region of interest (102), a drilling system may drill a wellbore (118) to access those hydrocarbons.

Figure 3:
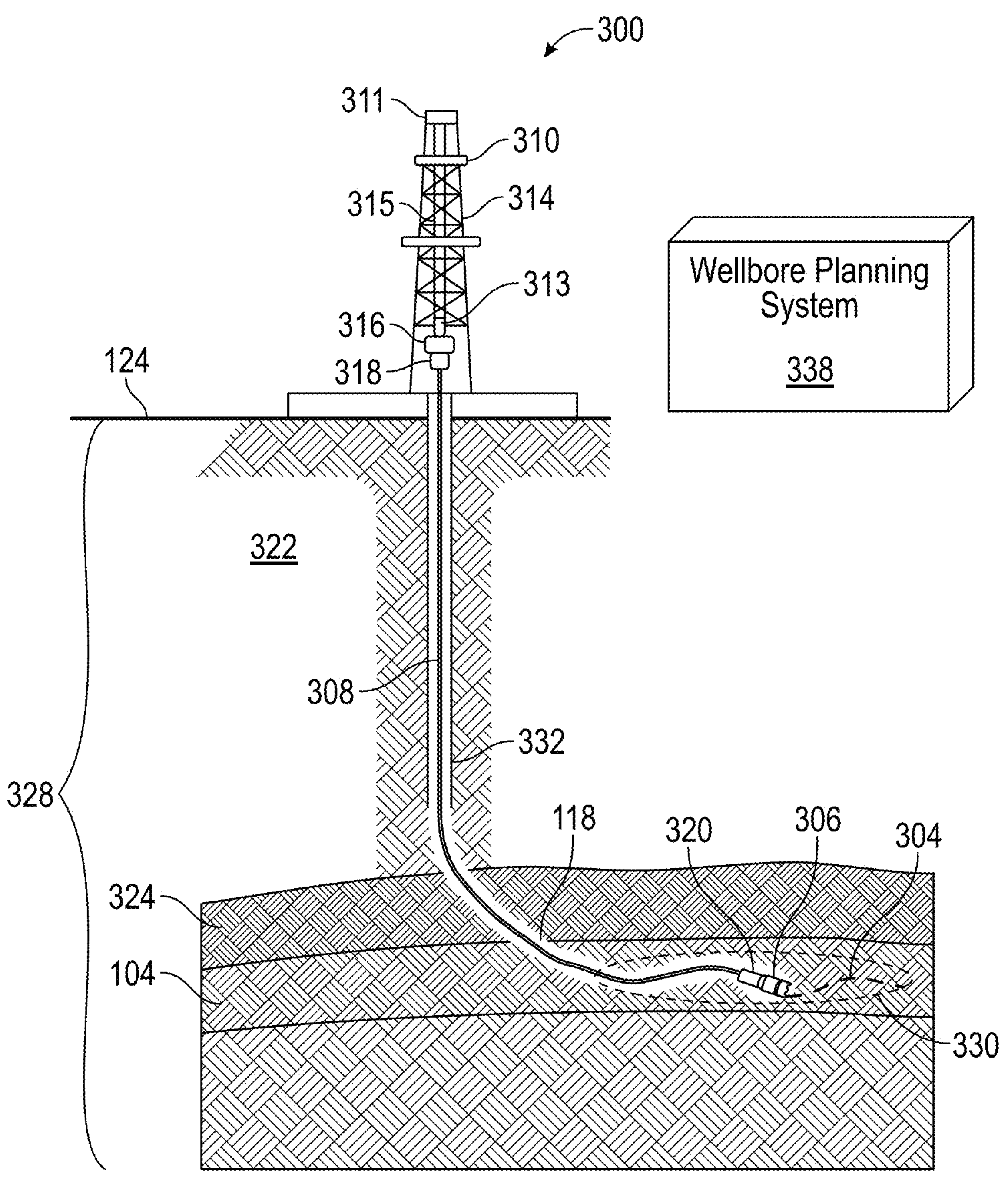
FIG. 3 shows a drilling system in accordance with one or more embodiments.

FIG. 3 shows a drilling system (300) in accordance with one or more embodiments. As shown in FIG. 3, a wellbore (118) following a wellbore trajectory (304) may be drilled by a drill bit (306) attached by a drillstring (308) to a drilling rig (310) located on the surface (124) of the earth. The drilling rig (310) may include framework, such as a derrick (314) to hold drilling machinery. A crown block (311) may be mounted at the top of the derrick (314), and a traveling block (313) may hang down from the crown block (311) by means of a cable (315) or drilling line. One end of the cable (315) may be connected to a drawworks (not shown), which is a reeling device that may be used to adjust the length of the cable (315) so that the traveling block (313) may move up or down the derrick (314).

A top drive (316) provides clockwise torque via the drive shaft (318) to the drillstring (308) in order to drill the wellbore (118). The drillstring (308) may comprise a plurality of sections of drillpipe attached at the uphole end to the drive shaft (318) and downhole to a bottomhole assembly ("BHA") (320). The BHA (320) may be composed of a plurality of sections of heavier drillpipe and one or more measurement-while-drilling ("MWD") tools configured to measure drilling parameters, such as torque, weight-on-bit, drilling direction, temperature, etc., and one or more logging tools configured to measure parameters of the rock surrounding the wellbore (118), such as electrical resistivity, density, sonic propagation velocities, gamma-ray emission, etc. MWD and logging tools may include sensors and hardware to measure downhole drilling parameters, and these measurements may be transmitted to the surface (124) using any suitable telemetry system known in the art. The BHA (320) and the drillstring (308) may include other drilling tools known in the art but not specifically shown.

The wellbore (118) may traverse a plurality of overburden (322) layers and one or more formations (324) to a reservoir (104) within the subterranean region (328), and specifically to a drilling target (330) within the reservoir (104). The wellbore trajectory (304) may be a curved or a straight trajectory. All or part of the wellbore trajectory (304) may be vertical, and some wellbore trajectory (304) may be deviated or have horizontal sections. One or more portions of the wellbore (118) may be cased with casing (332) in accordance with a wellbore plan.

To start drilling, or "spudding in" the well, the hoisting system lowers the drillstring (308) suspended from the derrick (314) towards the planned surface location of the wellbore (118). An engine, such as an electric motor, may be used to supply power to the top drive (316) to rotate the drillstring (308) through the drive shaft (318). The weight of the drillstring (308) combined with the rotational motion enables the drill bit (306) to bore the wellbore (118).

The drilling system (300) may be disposed at and communicate with other systems in the well environment, such as a seismic processor (220) and a wellbore planning system (338). The drilling system (300) may control at least a portion of a drilling operation by providing controls to various components of the drilling operation. In one or more embodiments, the drilling system (300) may receive well-measured data from one or more sensors and/or logging tools arranged to measure controllable parameters of the drilling operation. During operation of the drilling system (300), the well-measured data may include mud properties, flow rates, drill volume and penetration rates, rock physical properties, etc.

In some embodiments, the rock physical properties may be used by a seismic processor (220) to determine a location of a reservoir (104) (or other subterranean features). Knowledge of the existence and location of the reservoir (104) and other subterranean features may be transferred from the seismic processor (220) to a wellbore planning system (338). The wellbore planning system (338) may use information regarding the reservoir (104) location to plan a well, including a wellbore trajectory (304) from the surface (124)

of the earth to penetrate the reservoir (104). In addition, to the depth and geographic location of the reservoir (104), the planned wellbore trajectory (304) may be constrained by surface limitations, such as suitable locations for the surface position of the wellhead, i.e., the location of potential or preexisting drilling rigs, drilling ships or from a natural or man-made island.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Information regarding the planned wellbore trajectory (304) may be transferred to the drilling system (300) described in FIG. 3. The drilling system (300) may drill the wellbore (118) along the planned wellbore trajectory (304) to access the drilling target (330) in the reservoir (104).

Figure 4:
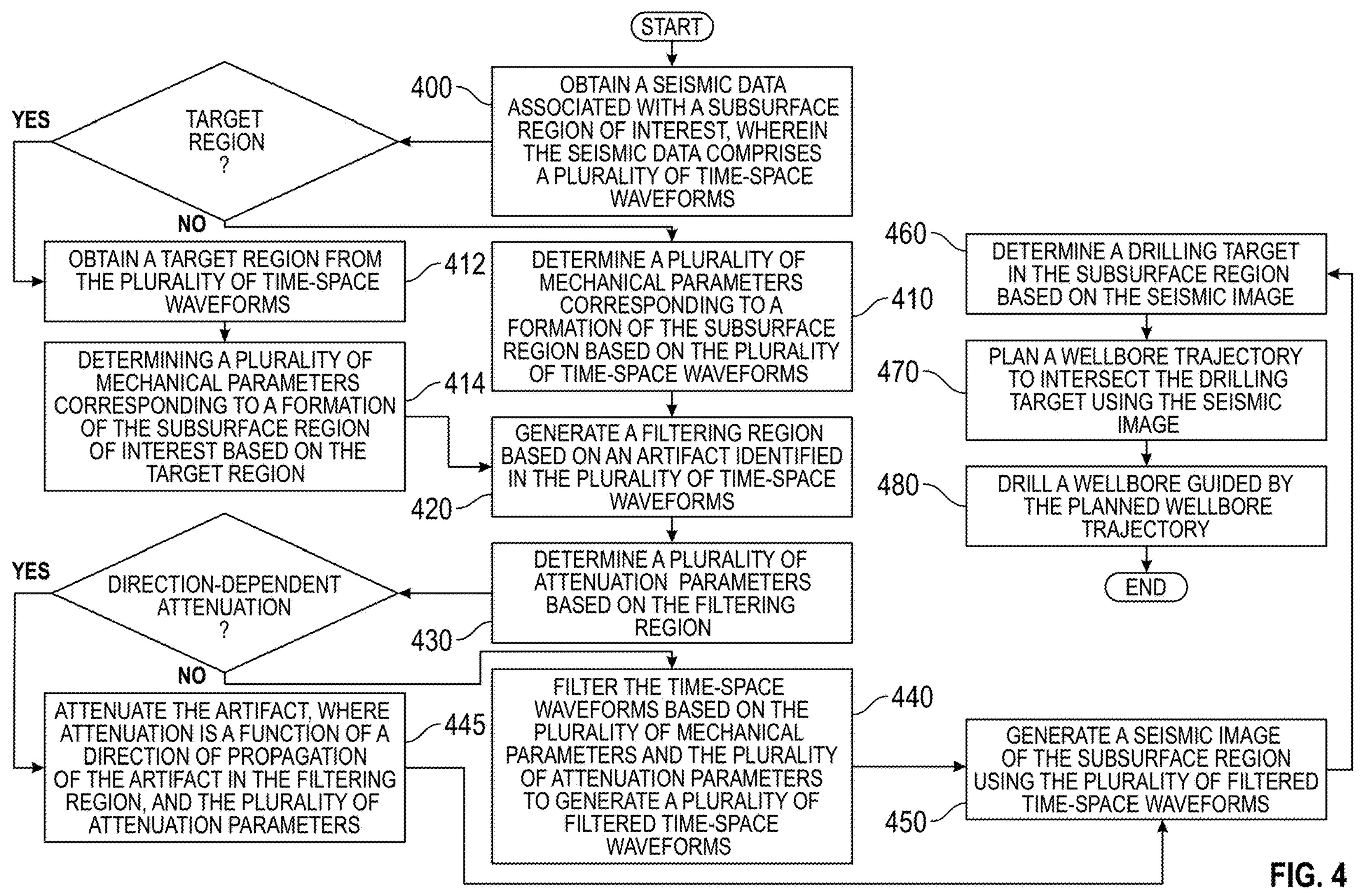
FIG. 4 shows a flowchart in accordance with one or more embodiments.

Turning to FIG. 4, FIG. 4 shows a flowchart in accordance with one or more embodiments. Specifically, FIG. 4 describes a general method to filter unwanted artifacts from seismic data. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, seismic data (202) associated with a subsurface region of interest is obtained. The seismic data (202) may be acquired using a seismic acquisition system (100) above a subsurface region of interest (102). The seismic data (202) may be processed to attenuate noise and may be organized in one or more spatial dimensions (216, 218) and a time axis (214) to form a plurality of time-space waveforms. In some embodiments, one or more common-shot gathers (CSG) (210) may be generated with the source position corresponding to the middle of the offset, as illustrated in FIG. 2.

In Block 410, a plurality of mechanical parameters corresponding to a formation (324) of the subsurface region (102) of interest is determined based on the plurality of time-space waveforms, according to one or more embodiments. Illustrative mechanical parameters may correspond to the constants needed to perform numerical simulations matching each of the CSGs (210) based on the following modified equation of seismic wave propagation:

$$\rho\frac{\partial^2 v}{\partial t^2} + 2\rho\zeta\gamma E\frac{\partial v}{\partial t} + \rho\gamma^2 v = C:\nabla^2 v \tag{1}$$

In Equation (1), C is the tensor of elastic constants, $\rho$ is the density, E is a tensor of second order whose elements depend on the direction of wave propagation, and v is the vector of particle velocities. The factor $\zeta$ is set equal to 1 for wave attenuation, $-1$ for wave amplification, and 0 for elastic wave propagation. The parameter $\gamma$ is also associated to attenuation, and will be described in more detail below.

In some embodiments, a set of elastic constants characterizes wave propagation phenomena in each formation (324) in the domain of the CSG (210) under consideration. In other embodiments, an aperture in the CSG (210) may be defined to obtain a target region, as shown in Block 412. A target region may be a portion of a subsurface region (102) or volume that includes one or more formations of interest desired or selected for analysis, e.g., for determining location of hydrocarbons or reservoir development purposes. The target region may be also implemented to reduce computational costs when processing large volumes of seismic data (202).

Then, as shown in Block 414, the mechanical parameters of the formations (324) may be determined from data associated with the target region.

The elastic constants that define the tensor C, may be expressed in terms of stiffness or in terms of flexibility, to relate the deformations in the propagation medium when subjected to applied forces. The mechanical parameters for elastic media may be equivalently expressed in terms of the velocity of propagation of the seismic waves. As a non-limiting example, in the case of isotropic media, the mechanical parameters may be described by the density and the velocity of propagation of two types of waves, compressional or primary (P-waves) and transversal or shear (S-waves).

An accurate velocity model may be useful for accurate simulations and modeling of the subsurface. Furthermore, a velocity model may be used, among other things, to identify the structure of the subsurface (e.g. the depth of subsurface formations) and to monitor carbon dioxide ($CO_2$) distributions and retention. Further, a velocity model may be integrated with, or inform, other subsurface models.

A velocity model can be constructed by processing recorded seismic data (202) obtained using a seismic acquisition system (100). Processing seismic data (202) to obtain a velocity model may be considered an inverse problem, where the applied process must determine the subsurface velocity model that resulted in the recorded seismic data (202). The various processes and techniques used to process seismic data (202) to form a velocity model may generally be categorized as either a "data-domain approach", such as full-waveform inversion (FWI), or an "image-domain approach", such as migration velocity analysis. Machine learning models and deep learning frameworks may be also implemented to determine a velocity model from given seismic data (202).

Figure 5:
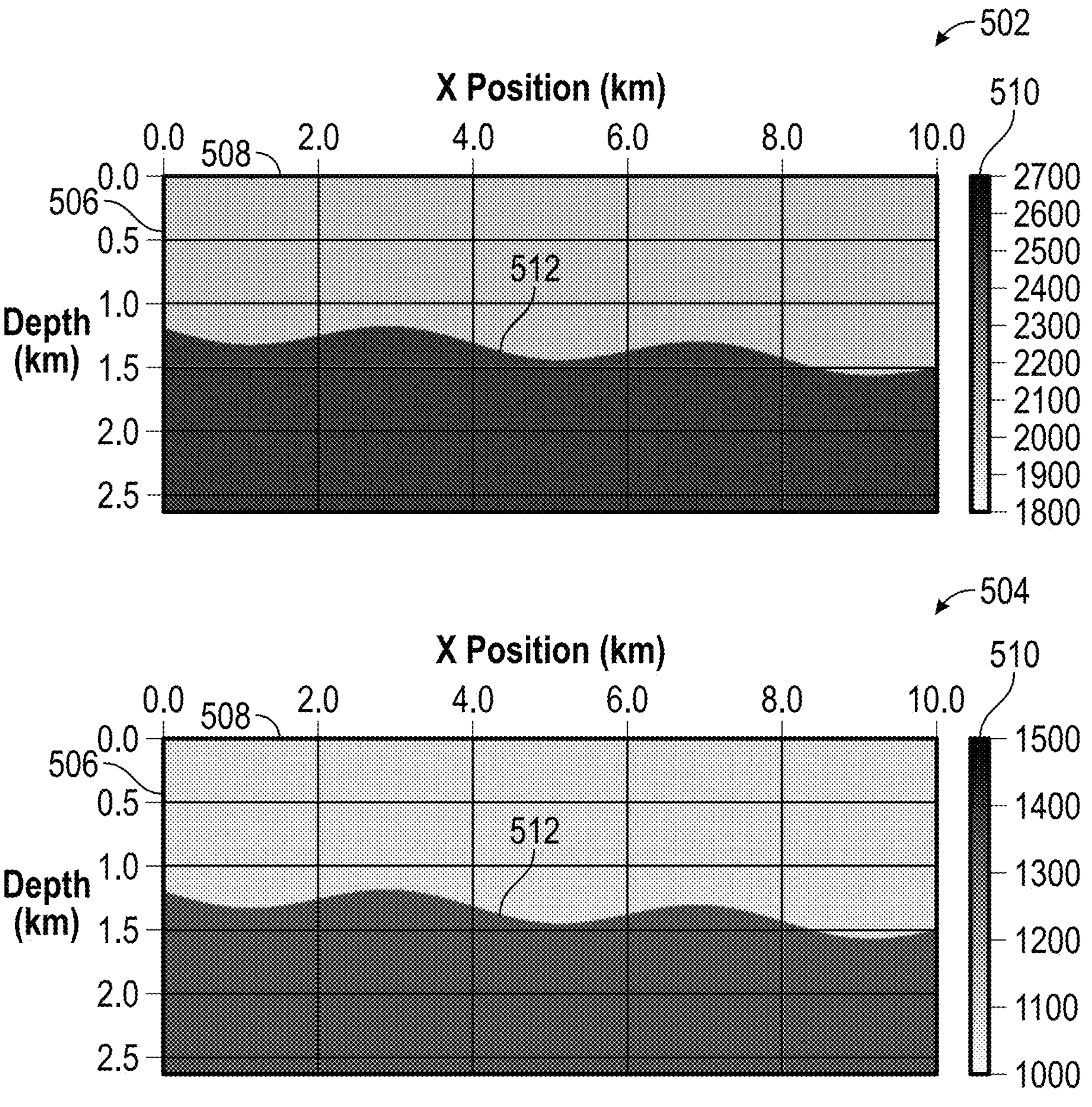
FIG. 5 illustrates velocity models for a simplified subsurface structure according to one or more embodiments.

FIG. 5 illustrates velocity models for a simplified subsurface structure, composed of two layers or formations (324). FIG. 5 shows a P-wave velocity model (502) and an S-wave velocity model (504) defined in depth (506) (vertical axis) and in one horizontal x-dimension (508). The variation of the magnitude of the velocities is given by the scale bar (510). As it may be the case in an actual subsurface structure, the scale bars (510) illustrate that the magnitude of the velocities, both for P- and S-waves, increases with depth. An interface or geological boundary (512) separates the different velocity values of the two layers.

Returning to FIG. 4, in Block 420, a filtering region is generated based on an artifact identified in the plurality of time-space waveforms, according to one or more embodiments. When constructing a subsurface model, unwanted reflections and refractions from certain types of geobodies such as top of the salt body may be considered as artifacts. Reflections from truncation boundaries may be also considered as artifacts to be attenuated. In some embodiments, a filtering region may be an area in a target region or CSG (210) with undesired arrivals or artifacts to be attenuated. In addition, a filtering region to attenuate arrivals may be implemented to investigate an impact of certain portions of the subsurface model during numerical simulations and modeling.

Figure 6:
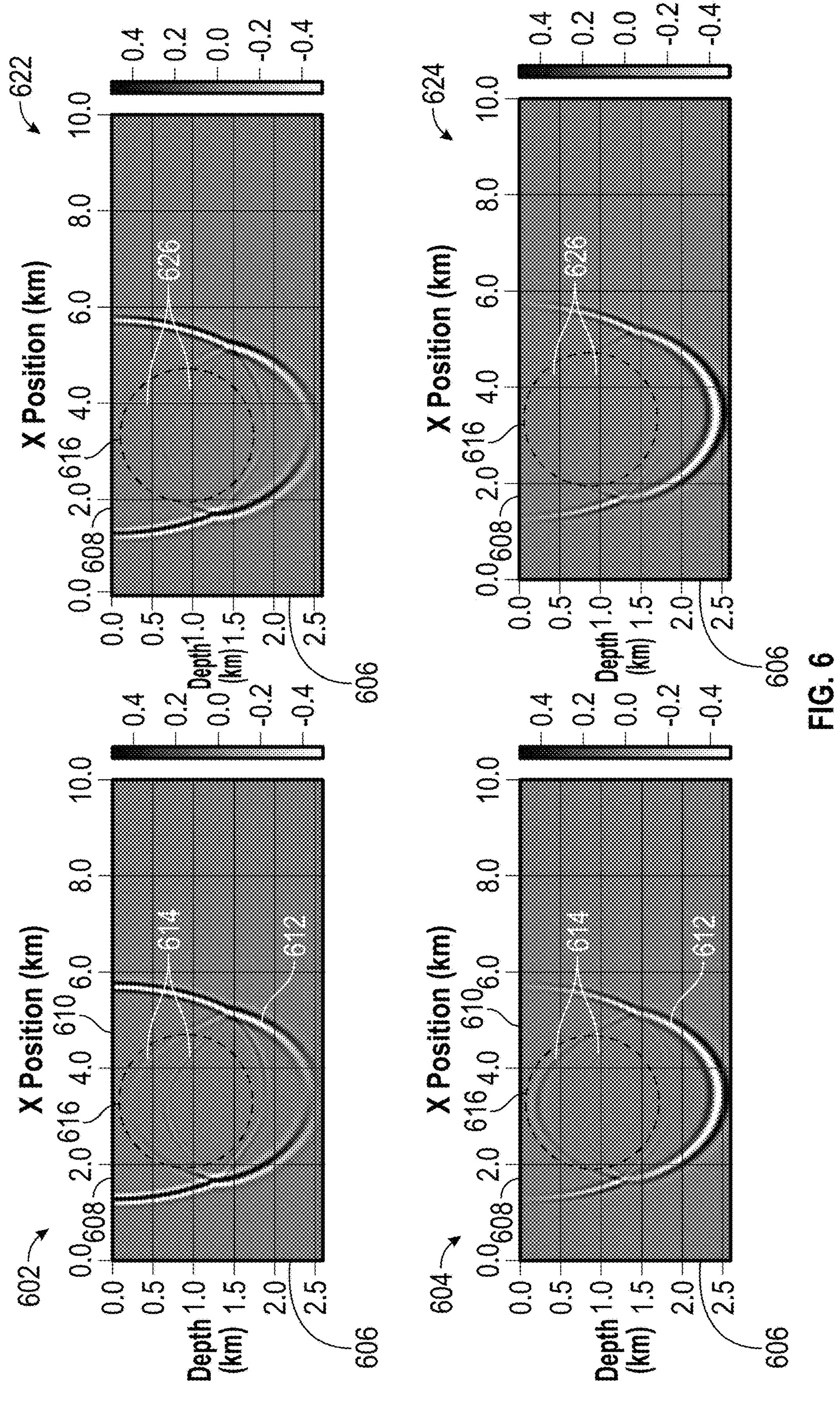
FIG. 6 illustrates snapshots of propagation of particle velocity in a subsurface model, according to one or more embodiments.

FIG. 6 illustrates snapshots of propagation of particle velocity in the subsurface model of FIG. 5, according to one or more embodiments, and can be useful for visualizing one or more undesired arrivals or artifacts. Snapshots (602, 604) in the (x–, depth) domain illustrate the propagation of the horizontal and vertical components of particle velocity, respectively. The vertical axis indicates the depth (606) and the horizontal axis indicates the x-horizontal dimension (608). According to the example shown in FIG. 6, the seismic source (610) generating the seismic waves was located at the surface (0 km depth) and at 3.5 km in the x-horizontal dimension (608). Snapshots (602, 604) show a downward wavefront (612) propagating in the direction of increasing depth away from the source (610) that generated it. However, other wavefronts (614) are also noticeable propagating upwards, in the direction of decreasing depth. The upward wavefronts (614) are composed of waves reflected at the geological boundary (512) between the two layers of the subsurface model. In this case the upward wavefronts (614) may correspond to artifacts, and the region including the upward wavefronts (614) may be defined as the filtering region (616), indicated by the dashed circle in snapshots (602, 604).

Continuing with FIG. 4, in Block 430, a plurality of attenuation parameters is determined based on the filtering region, according to one or more embodiments. Attenuation parameters may be generated, for example, to induce amplitude decay in seismic data associated to the filtering region. Seismic waves may undergo seismic attenuation when traveling within a medium, such as the earth's subsurface. For example, seismic attenuation may be an intrinsic property of rocks that relates to energy dissipation as seismic waves propagate through the subsurface. As such, attenuation may result in the decay of seismic wave amplitudes. Furthermore, beyond simple energy losses, seismic attenuation may also cause a seismic wave to experience phase changes, i.e., pulse broadening with increasing distances. As the wave spreads, seismic attenuation may thereby remove high frequency components of the seismic wave.

In modeling seismic attenuation, seismic data processing may use a viscoelastic attenuation factor, often expressed as seismic quality factor Q. The seismic quality factor Q may be determined using Q tomography, where the seismic quality factor Q is inversely proportional to the viscoelastic attenuation factor.

An accurate seismic quality factor Q may be used to induce amplitude decay in seismic data. Using Q tomography, for example, attenuation parameters may be generated from various geological regions. These attenuation parameters may include three-dimensional models of the subsurface for either a P-wave (i.e., based on a seismic quality factor Qp) or an S-wave (i.e., based on a seismic quality factor Qs). In some embodiments, Q tomography may use a ray-based method based on pre-stack migrated common image gathers for estimating the quality factor Q. Likewise, various Q processing techniques may be implemented within other seismic data processes, such as Q full waveform inversion or Q migration.

The parameter $\gamma$ in Equation (1), associated to the attenuation of the artifacts in the filtering region, may be a function of the quality factor, as follows:

$$\gamma = \frac{\pi f}{Q} \qquad (2)$$

where f denotes the dominant temporal frequency and Q is the quality factor.

In order to attenuate artifacts in the filtering region, quality factors Q of finite magnitude may be assigned to the different formations through which the artifacts propagate. For other areas outside the filtering region, where no attenuation is desired, the quality factor Q may be set, for example, to infinity. In some embodiments, the quality factor Q used for attenuation of artifacts may be the P-wave quality factor. The attenuation parameters, and specifically the quality factor Q, may be adjusted iteratively during processing or during numerical simulations to improve the attenuation of the artifacts.

One desired property in attenuating artifacts is that seismic waves of all frequencies undergo a similar or same amplitude decay. Therefore, the shapes of pulses or wavelets at all wavefronts are preserved, making them suitable for creating an accurate depth-domain seismic image (234). Thus, the attenuation parameters, including the seismic quality factor Q may be frequency-independent. Another advantage of frequency-independent attenuation of artifacts may be a reduction of the computational cost of the numerical simulations. Actual, viscoelastic, frequency-dependent attenuation relates the current state of the physical system to a part of or all the past history of forces/deformations, that may involve a continuous storage of variables during the simulation. With frequency-independent attenuation the current state of the physical system may be related to only a few past instants, and thus simulations may not involve the continuous storage of variables.

In Block 440, the time-space waveforms are filtered based on the plurality of mechanical parameters and the plurality of attenuation parameters to generate a plurality of filtered time-space waveforms, according to one or more embodiments. For example, the plurality of filtered time-space waveforms may be generated with numerical simulations that implement the attenuation parameters to attenuate artifacts. Numerical simulations may be performed by solving the equation of seismic wave propagation, given by Equation (1) above. The solution may be obtained in terms of particle velocities v as a function of one or more spatial dimensions (x,y,z) and time, $t \in [0, T]$ where T is the total duration of the simulation.

According to some embodiments Equation (1) may be solved by first discretizing it in time and space. Discretizing in space may involve the construction of a spatial grid related to the subsurface region or target region, with various grid nodes corresponding to different locations within the subsurface region or target region. As such, a spatial grid may be two-dimensional or three-dimensional, where grid nodes provide discretized local solutions for particle velocities v during a simulation. The grid data may be obtained from a parameter file, where the parameter file includes grid node numbers, grid space dimensional information, and seismic source positions in the grid model. While the grid data may correspond to a regular grid, irregular grids are also contemplated with nonuniform grids, tree-based data structures, or triangulated meshes.

In accordance with one or more embodiments, an equation of seismic wave propagation that has been discretized in space may be discretized in time by, for example, subdividing the simulation interval [0, T] into time steps, $\Delta t$. In some embodiments, $\Delta t$ may be constant and in other embodiments, $\Delta t$ may vary throughout the simulation. The discretization may result in a system of discrete differential equations that may be solved for any simulation interval [0, T] using an explicit or an iterative integration scheme.

In some embodiments, the direction of propagation of artifacts traversing the filtering region changes with time. In such cases, it may be desirable to implement attenuation parameters that are automatically adjusted to changes in the direction of propagation of the artifacts, as shown in Block 445. The tensor E in Equation (1) provides the direction of propagation of the seismic waves. In some embodiments, the tensor E may take the form:

$$E = I - \alpha N \cdot L \tag{3}$$

where $\alpha$ is a constant $0 \le \alpha \le 1$ and the tensors I, N, and L may be defined on three spatial dimensions (x,y,z) as follows:

$$I = \begin{pmatrix} 1 & 0 & 0 \\ 0 & 1 & 0 \\ 0 & 0 & 1 \end{pmatrix}, N = \begin{pmatrix} n_x & 0 & 0 \\ 0 & n_y & 0 \\ 0 & 0 & n_z \end{pmatrix} L = \begin{pmatrix} l_x & 0 & 0 \\ 0 & l_y & 0 \\ 0 & 0 & l_z \end{pmatrix} \tag{4}$$

where $n_x$, $n_y$, and $n_z$ are the components of the unit vector of local directions of wave propagation, and $l_x$, $l_y$, and $l_z$ are the components of a unit vector of pre-determined directions of anisotropy. Anisotropy may be present in a propagating medium if the velocity of propagation of the seismic waves changes with the direction of propagation. As a non-limiting example, the components $l_x$, $l_y$, and $l_z$ may correspond to the axes of symmetry in a medium with tilted transverse isotropy (TTI). Equation (3) is in fact a non-linear system of equations because the tensor N also depends on the direction of wave propagation. Various types of techniques may be used to determine the direction of wave propagation. The energy flux (Poynting) vector, optical flow, and wavefield decomposition are non-limiting examples of techniques to compute wave propagation direction.

The value of the constant $\alpha$ in Equation (3) may be proportional to the level of dependency of the tensor E (and therefore, of the attenuation parameters) on the direction of propagation of the seismic waves. For example, a 0 value for $\alpha$ reduces the tensor E to the identity matrix I and thus, the attenuation parameters would not depend on the direction of propagation of the artifacts. A non-zero value of $\alpha$ between 0 and 1 would provide different levels of attenuation depending on the direction of propagation of the seismic waves.

Turning again to FIG. 6, FIG. 6 illustrates numerical simulations to attenuate the artifacts or upward wavefronts (614) identified in the filtering region (616). Snapshots (622) and (624) in the (x–, depth) domain illustrate the attenuation of artifacts in the horizontal and vertical components of particle velocity, respectively. In the filtering region (616) the tensor E is computed with Equation (3) with a vertical symmetry axis pointing in the direction of increasing depth. The direction of wave propagation may be estimated with the Poynting vector, which represents the density of energy flux. The instantaneous Poynting vector may be estimated by multiplying time and spatial first derivatives of the seismic wavefield, and thus, it does not involve transforming the wavefield to a wavenumber or frequency domain.

A P-wave quality factor Q of 10 is implemented in the filtering region (616), and in the rest of the spatial (x–, depth) domain an infinite quality factor Q is used. Furthermore, attenuation is implemented only for waves propagating upwards (626) in the filtering region. These waves correspond to the upward wavefronts (614) resulting from energy reflected at the geological boundary (512). Attenuation of such reflections (626) as shown in FIG. 6 illustrates the advantages of applying the procedure in the framework of reverse time migration, where back-propagating reflections may induce low-frequency noises in migrated seismic images (232).

Figure 7:
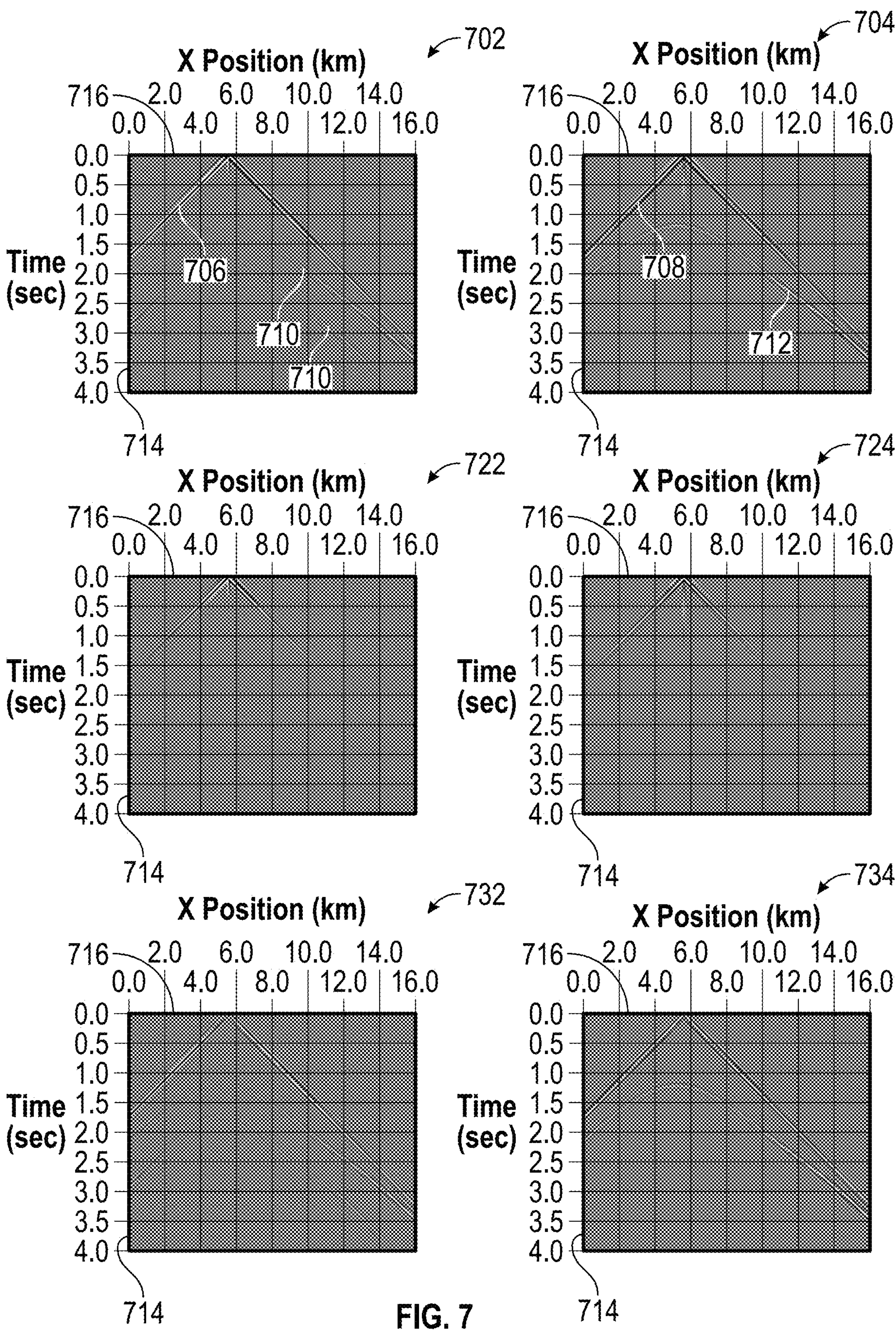
FIG. 7 shows several common shot gathers from receivers located at the surface of a subsurface model, in accordance with one or more embodiments.

Turning to FIG. 7, FIG. 7 shows several CSGs from receivers located at the surface of the subsurface model of FIG. 5. A CSG of horizontal particle velocity component (702) and a CSG of acoustic pressure (704) show output results of the same simulation illustrated in FIG. 6. Both CSGs (702, 704) show arrivals of direct waves (706, 708) and reflected waves (710, 712). The time scale (714) is indicated by the vertical axis and the x-horizontal dimension (716) is indicated by the horizontal axis. CSG of acoustic pressure (704) may be used in, for example, modelling and generation of seismic images (230) from marine data processing. FIG. 7 also shows the CSG of the horizontal component of filtered particle velocity (722) and the CSG of the filtered acoustic pressure (724). Both CSGs (722, 724) are obtained from attenuating the reflected waves (710, 712) at the geological boundary (512). In both CSGs (722, 724) is apparent that the reflected waves (710, 712) are significantly attenuated. This can be further confirmed by inspecting CSG (732) illustrating the difference between the initial CSG (702) and the filtered CSG (722) for the horizontal particle velocity component. A similar observation can be made from the CSG (734) illustrating the difference between the initial CSG (704) and the filtered CSG (724) for the acoustic pressure.

Figure 8:
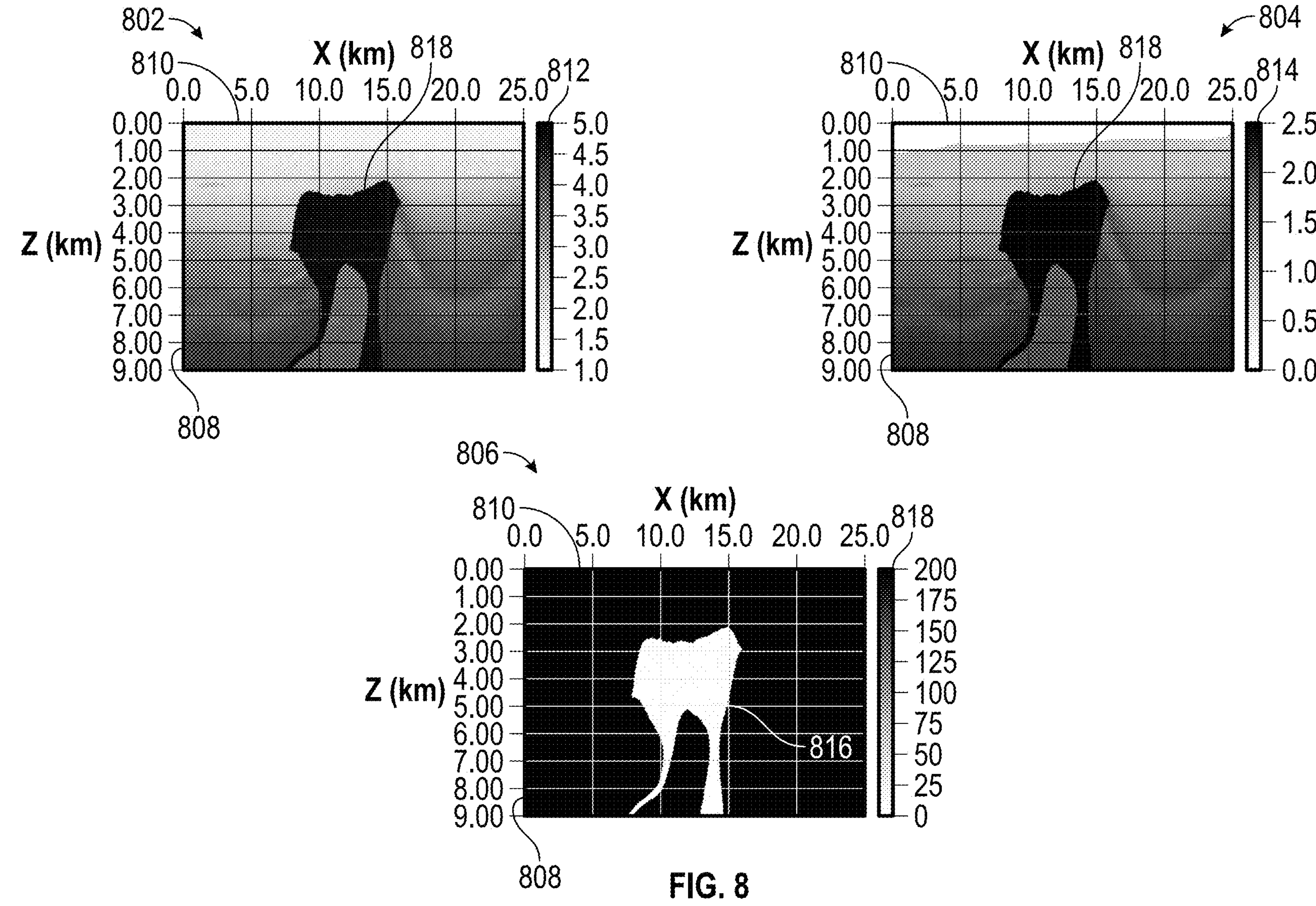
FIG. 8 shows examples of velocity models and a quality factor model, in accordance with one or more embodiments

Another example that showcases the capabilities of the proposed filtering method is based on the subsalt models shown in FIG. 8. FIG. 8 shows a P-wave velocity model (802), an S-wave velocity model (804), and a P-wave quality factor Q model (806) defined in depth (808) (vertical axis) and in one horizontal x-dimension (810). The variation of the magnitude of the velocities and the P-wave quality factor Q is given respectively by the scale bars (812, 814) and (816). A salt body, an example of a geological body (818), is clearly distinguished in the middle of the three models (802, 804, 806). In this example the constant $\alpha$ included on the attenuation parameters of Equation (3) is set equal to zero, implying that artifacts propagating in all directions will be attenuated.

Figure 9:
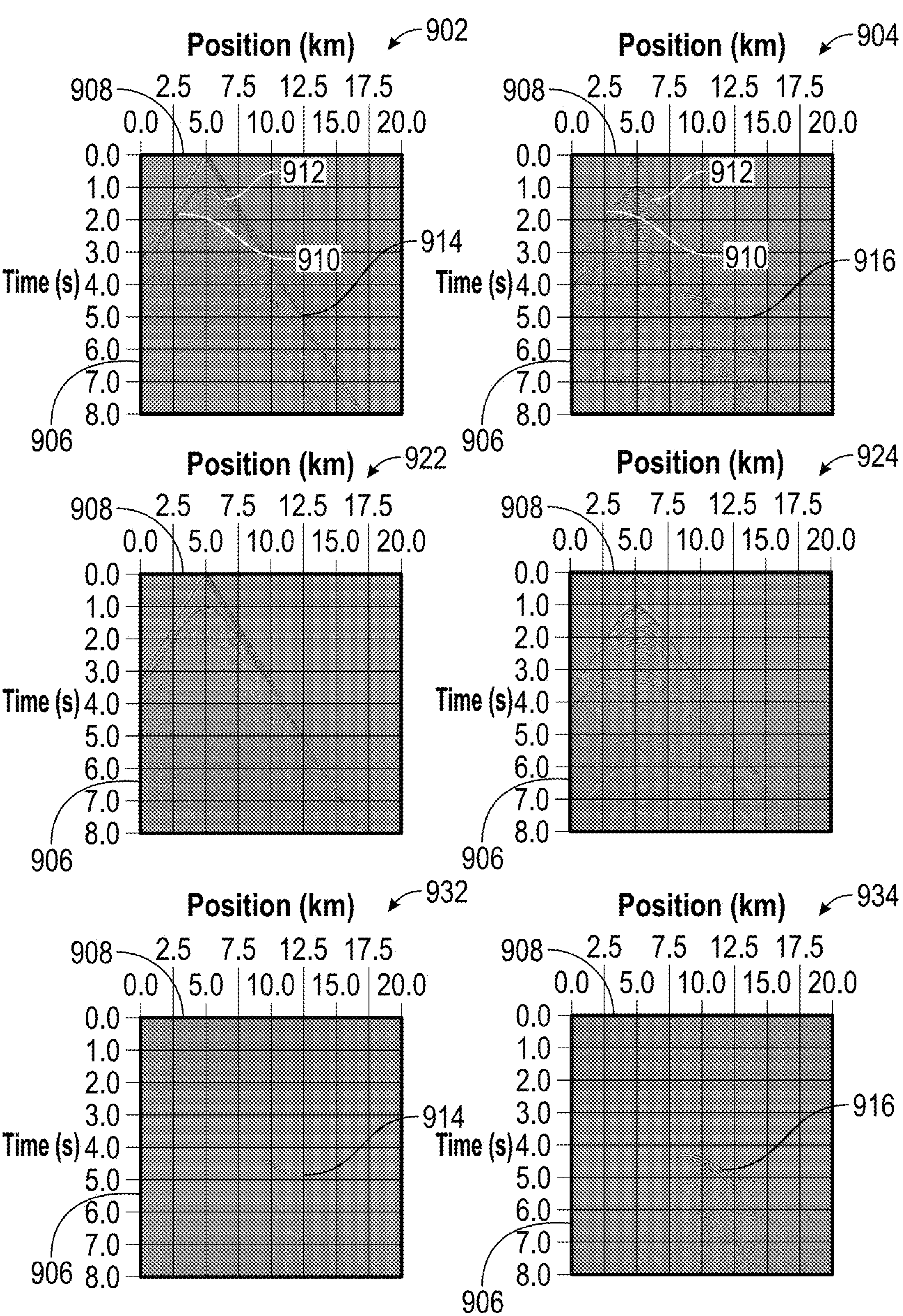
FIG. 9 shows an example of several common shot gathers from receivers located at the surface of a subsurface model, in accordance with one or more embodiments.

FIG. 9 illustrates several CSGs from receivers located at the surface of the subsalt models of FIG. 8. The seismic source in the numerical simulations shown in FIG. 8 is located at 5 km on the x-horizontal axis. The CSGs (902) and (904) show respectively the horizontal and vertical components of particle velocity. The time scale (906) is indicated by the vertical axis and the x-horizontal dimension (908) is indicated by the horizontal axis. CSGs (902) and (904) both show the arrival of direct waves (910), waves reflected (912) by sediments on top of the geological body (818), and at large offsets, waves refracted (914, 916) at the top of the geological body (818).

CSGs (922) and (924) illustrate respectively the horizontal and vertical components of the filtered particle velocity. CSG (932) shows the difference between the initial CSG (902) and the filtered CSG (922) for the horizontal component of particle velocity. Similarly, CSG (934) shows the difference between the initial CSG (904) and the filtered CSG (924) for the vertical component of particle velocity. As seen, the proposed filtering method attenuates the waves refracted (914, 916) at the top of geological body (818). The refracted waves (914, 916) are absent in CSGs (922, 924) and they are what remains in the difference between the initial and filtered wavefields, as shown in CSGs (932, 934).

On the other hand, the reflected waves (912) are not affected by the filtering procedure. Such result can be obtained by attenuation of the refracted waves (914, 916) using their specific direction of propagation. In addition, by using small values of quality factor Q inside the geological body (818), reflections inside and below of the geological body (818) can be effectively attenuated.

Figure 10:
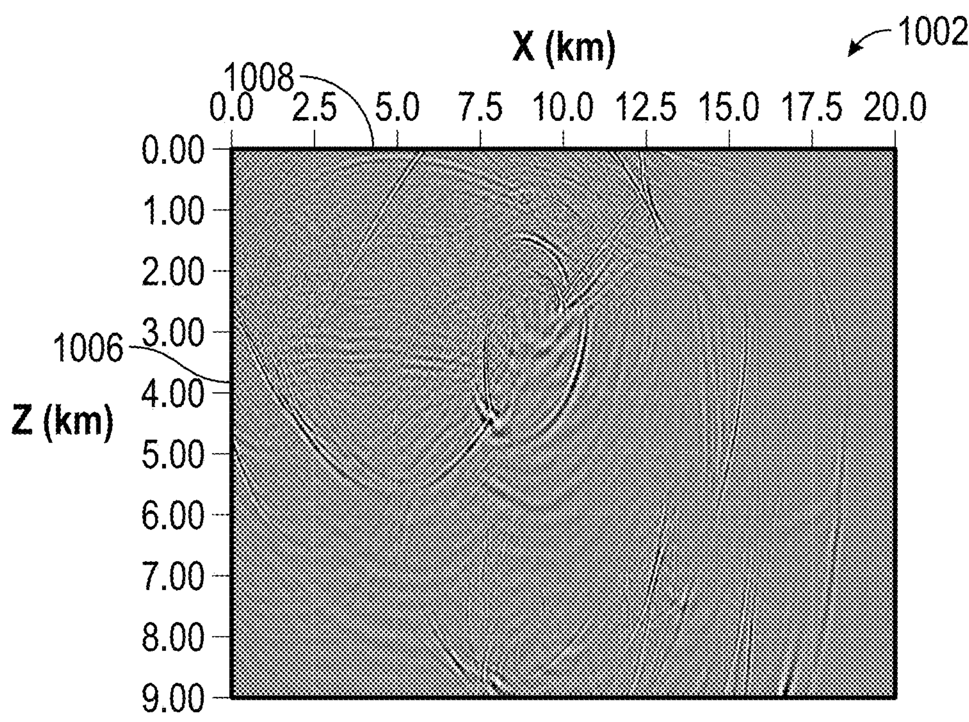
FIG. 10 shows snapshots of vertical component of simulated particle velocity, according to one or more embodiments.
Figure 10:
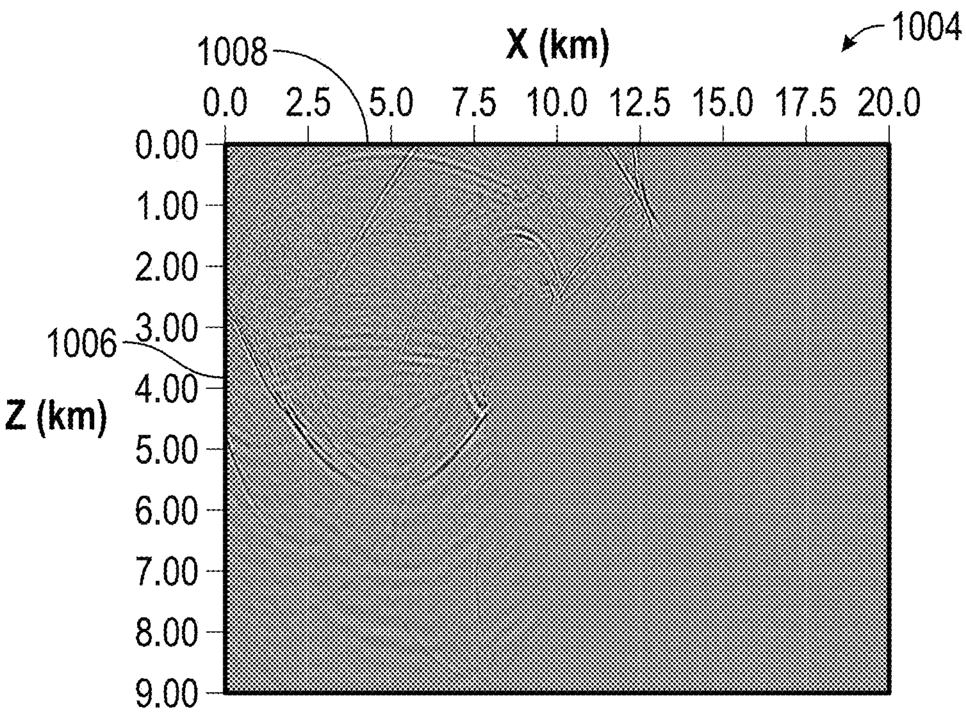

Turning to FIG. 10, FIG. 10 shows snapshots of the vertical component of particle velocity, for the simulation illustrated in FIG. 9. Snapshots (1002) and (1004) in the (x–, depth) domain illustrate the propagation of the vertical component of the particle velocity and the filtered particle velocity, respectively. The vertical axis indicates the depth (1006) dimension and the horizontal axis indicates the x-horizontal dimension (1008). FIG. 10 shows that the waves propagating through the geological body (818) are nearly or completely attenuated. Attenuating this type of reflections and refractions may be useful to avoid destructive interference of wavefields when investigating and/or generating seismic images (230).

Figure 11:
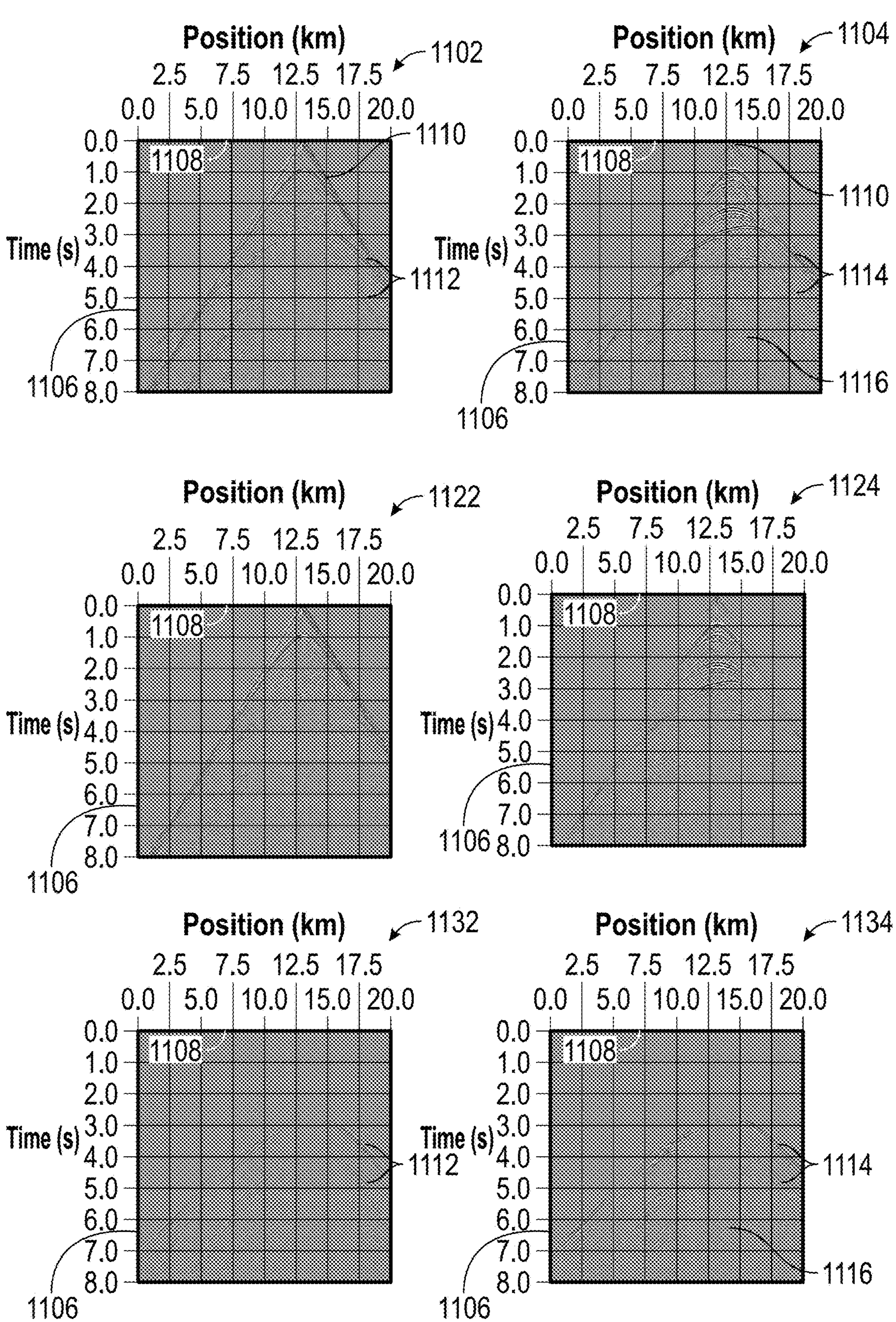
FIG. 11 illustrates an example of numerical simulations of wave propagation using subsalt models, according to one or more embodiments.

FIG. 11 illustrates another example of numerical simulations of wave propagation using the subsalt models of FIG. 8. In this example the receivers are also located at the surface (0 depth) of the models, but the seismic source is now located at 13 km on the x-horizontal axis. CSG (1102) and (1104) show respectively the horizontal and vertical components of particle velocity. The time scale (1106) is indicated by the vertical axis and the x-horizontal dimension (1108) is indicated by the horizontal axis. In this example we note in both CSGs (1102, 1104) the arrivals of direct waves (1110) and waves reflected (1112, 1114) at the top of the geological body (818).

CSGs (1122) and (1124) illustrate respectively the horizontal and vertical components of the filtered particle velocity. CSG (1132) shows the difference between the initial CSG (1102) and the filtered CSG (1122) for the horizontal component of particle velocity. Similarly, CSG (1134) shows the difference between the initial CSG (1104) and the filtered CSG (1124) for the vertical component of particle velocity. In this example, attenuation is applied to all waves reflected (1112, 1114) by the geological body (818). In addition, in this example the filtering procedure attenuates the waves backscattered (1116) at the bottom of geological body (818). Such backscattered waves (1116) may be considered undesirable noise in processing seismic data (202) to generate a seismic image (230).

Returning to FIG. 4, In Block 450, a seismic image of the subsurface region is generated using the plurality of filtered time-space waveforms, according to one or more embodiments. In some embodiments, seismic data (202) may include a plurality of CSGs (210) and each CSG (208) may include a plurality of time-space waveforms, as illustrated in FIG. 2. Attenuation of artifacts may be performed for each CSG (208), and the plurality of filtered CSGs may then be used by the seismic processor (220) to generate a seismic image (230). For example, a partial seismic image may be generated for each of the plurality of filtered CSGs obtaining a plurality of partial seismic images. A stacked seismic image may then be constructed, for example, by summing all the partial seismic images.

Furthermore, the seismic image (230) may be inspected to identify areas with artifacts that still need attenuation. Reprocessing for attenuating artifacts maybe performed in the filtered seismic data using quality factors of smaller values to increase the strength of attenuation in the identified areas.

In Block 460, a drilling target in the subsurface region may be determined based on the seismic image, in accordance with one or more embodiments. A drilling target (330) in a wellbore (118) may be based on, for example, an expected presence of gas or another hydrocarbon. Locations in a seismic image (230) may indicate an elevated probability of the presence of a hydrocarbon and may be targeted by well designers. On the other hand, locations in a seismic image (230) indicating a low probability of the presence of a hydrocarbon may be avoided by well designers.

In Block 470, a wellbore trajectory to intersect the drilling target is planned using the seismic image, in accordance with one or more embodiments. Knowledge of the location of the drilling target (330) and the seismic image (230) may be transferred to a wellbore planning system (338). Instructions associated with the wellbore planning system (338) may be stored, for example, in the memory (1209) within the computer system (1200) described in FIG. 12 below. The wellbore planning system (338) may use the knowledge of the location of the drilling target (330) and of the seismic image (230) to plan a wellbore trajectory (304) within the subterranean region of interest (102).

In Block 480, a wellbore is drilled guided by the planned wellbore trajectory, in accordance with one or more embodiments. The wellbore planning system (338) may transfer the planned wellbore trajectory (304) to the drilling system (300) described in FIG. 3. The drilling system (300) may drill the wellbore (118) along the planned wellbore trajectory (304) to access and produce the reservoir (104) to the surface (124).

Figure 12:
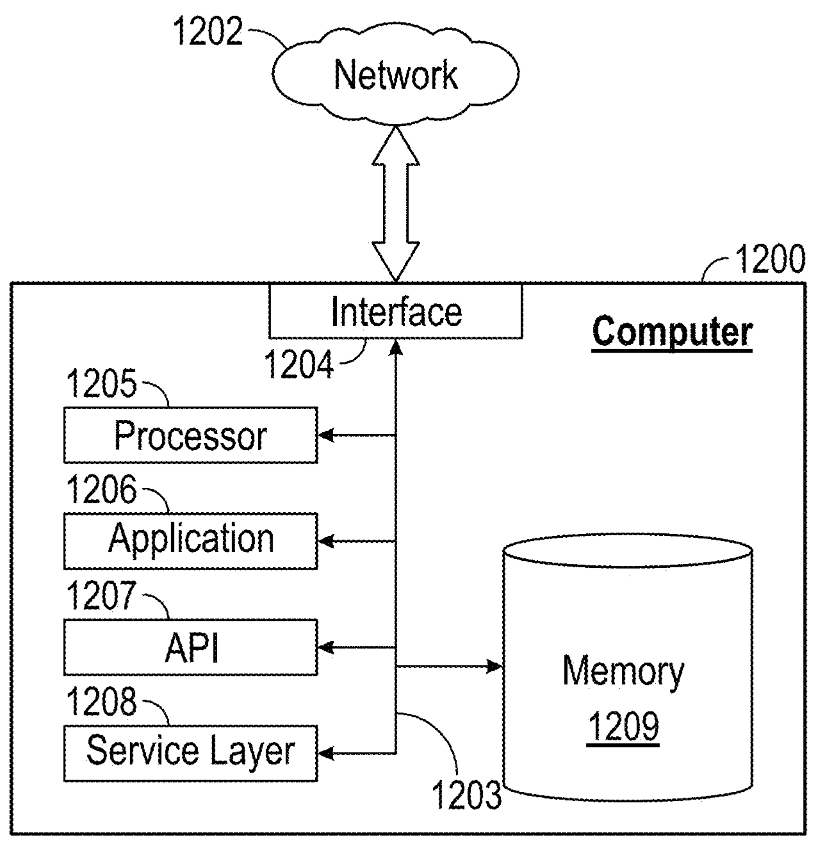
FIG. 12 illustrates a block diagram of a computer system in accordance with one or more embodiments.

In some embodiments the wellbore planning system (338) and the seismic processor (220) may each be implemented within the context of a computer system. FIG. 12 is a block diagram of a computer system (1200) used to provide computational functionalities associated with described algorithms, methods, functions, processes, flows, and procedures as described in the instant disclosure, according to an implementation. The illustrated computer (1200) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1200) may include a computer that includes an input device, such as a keypad, keyboard, touch screen, or other device that can accept user information, and an output device that conveys information associated with the operation of the computer (1200), including digital data, visual, or audio information (or a combination of information), or a GUI.

The computer (1200) can serve in a role as a client, network component, a server, a database or other persistency, or any other component (or a combination of roles) of a computer system for performing the subject matter described in the instant disclosure. The illustrated computer (1200) is communicably coupled with a network (1202). In some implementations, one or more components of the computer (1200) may be configured to operate within environments, including cloud-computing-based, local, global, or other environment (or a combination of environments).

Δt a high level, the computer (1200) is an electronic computing device operable to receive, transmit, process, store, or manage data and information associated with the described subject matter. According to some implementations, the computer (1200) may also include or be communicably coupled with an application server, e-mail server, web server, caching server, streaming data server, business intelligence (BI) server, or other server (or a combination of servers).

The computer (1200) can receive requests over network (1202) from a client application (for example, executing on another computer (1200)) and responding to the received requests by processing the said requests in an appropriate software application. In addition, requests may also be sent to the computer (1200) from internal users (for example, from a command console or by other appropriate access method), external or third-parties, other automated applications, as well as any other appropriate entities, individuals, systems, or computers.

Each of the components of the computer (1200) can communicate using a system bus (1203). In some implementations, any or all of the components of the computer (1200), both hardware or software (or a combination of hardware and software), may interface with each other or the interface (1204) (or a combination of both) over the system bus (1203) using an application programming interface (API) (1207) or a service layer (1208) (or a combination of the API (1207) and service layer (1208)). The API (1207) may include specifications for routines, data structures, and object classes. The API (1207) may be either computer-language independent or dependent and refer to a complete interface, a single function, or even a set of APIs. The service layer (1208) provides software services to the computer (1200) or other components (whether or not illustrated) that are communicably coupled to the computer (1200). The functionality of the computer (1200) may be accessible for all service consumers using this service layer (1208). Software services, such as those provided by the service layer (1208), provide reusable, defined business functionalities through a defined interface. For example, the interface may be software written in JAVA, C++, or other suitable language providing data in extensible markup language (XML) format or other suitable format. While illustrated as an integrated component of the computer (1200), alternative implementations may illustrate the API (1207) or the service layer (1208) as stand-alone components in relation to other components of the computer (1200) or other components (whether or not illustrated) that are communicably coupled to the computer (1200). Moreover, any or all parts of the API (1207) or the service layer (1208) may be implemented as child or sub-modules of another software module, enterprise application, or hardware module without departing from the scope of this disclosure.

The computer (1200) includes an interface (1204). Although illustrated as a single interface (1204) in FIG. 12, two or more interfaces (1204) may be used according to particular needs, desires, or particular implementations of the computer (1200). The interface (1204) is used by the computer (1200) for communicating with other systems in a distributed environment that are connected to the network (1202). Generally, the interface (1204) includes logic encoded in software or hardware (or a combination of software and hardware) and operable to communicate with the network (1202). More specifically, the interface (1204) may include software supporting one or more communication protocols associated with communications such that the network (1202) or interface's hardware is operable to communicate physical signals within and outside of the illustrated computer (1200).

The computer (1200) includes at least one computer processor (1205). Although illustrated as a single computer processor (1205) in FIG. 12, two or more processors may be used according to particular needs, desires, or particular implementations of the computer (1200). Generally, the computer processor (1205) executes instructions and manipulates data to perform the operations of the computer (1200) and any algorithms, methods, functions, processes, flows, and procedures as described in the instant disclosure.

The computer (1200) also includes a memory (1209) that holds data for the computer (1200) or other components (or a combination of both) that may be connected to the network (1202). For example, memory (1209) may be a database storing data consistent with this disclosure. Although illustrated as a single memory (1209) in FIG. 12, two or more memories may be used according to particular needs, desires, or particular implementations of the computer (1200) and the described functionality. While memory (1209) is illustrated as an integral component of the computer (1200), in alternative implementations, memory (1209) may be external to the computer (1200).

The application (1206) is an algorithmic software engine providing functionality according to particular needs, desires, or particular implementations of the computer (1200), particularly with respect to functionality described in this disclosure. For example, application (1206) can serve as one or more components, modules, applications, etc. Further, although illustrated as a single application (1206), the application (1206) may be implemented as multiple applications (1206) on the computer (1200). In addition, although illustrated as integral to the computer (1200), in alternative implementations, the application (1206) may be external to the computer (1200).

There may be any number of computers (1200) associated with, or external to, a computer system containing computer (1200), each computer (1200) communicating over network (1202). Further, the term "client," "user," and other appropriate terminology may be used interchangeably as appropriate without departing from the scope of this disclosure. Moreover, this disclosure contemplates that many users may use one computer (1200), or that one user may use multiple computers (1200).

In some embodiments, the computer (1200) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method comprising:

obtaining seismic data associated with a subsurface region of interest, wherein the seismic data comprises a plurality of time-space waveforms;

determining a plurality of mechanical parameters corresponding to a formation of the subsurface region of interest based, at least in part, on the plurality of time-space waveforms;

generating a filtering region based on an artifact identified in the plurality of time-space waveforms;

determining a plurality of attenuation parameters based, at least in part, on the filtering region, the plurality of attenuation parameters being configured to attenuate the artifact;

filtering the plurality of time-space waveforms based, at least in part, on the plurality of mechanical parameters and the plurality of attenuation parameters to generate a plurality of filtered time-space waveforms;

generating a seismic image of the subsurface region of interest using the plurality of filtered time-space waveforms;

determining a drilling target in the subsurface region of interest based on the seismic image;

planning, using a wellbore planning system, a planned wellbore trajectory to intersect the drilling target in the subsurface region of interest based, at least in part, on the seismic image; and drilling a wellbore guided by the planned wellbore trajectory using a drilling system.

2. The method of claim 1, wherein the artifact is caused by a geological body.

3. The method of claim 1, wherein the artifact is caused by a geological boundary.

4. The method of claim 1, further comprising:

obtaining a target region from the plurality of time-space waveforms; and determining the plurality of mechanical parameters corresponding to the formation of the subsurface region of interest based, at least in part, on the target region.

5. The method of claim 1, wherein the plurality of attenuation parameters are frequency independent.

6. The method of claim 1, wherein the filtering comprises attenuation of the artifact, the attenuation being a function of a direction of propagation of the artifact in the filtering region, and the plurality of attenuation parameters.

7. A non-transitory computer-readable medium comprising computer-executable instructions stored thereon that, when executed on a processor, cause the processor to perform:

obtaining seismic data associated with a subsurface region of interest, wherein the seismic data comprises a plurality of time-space waveforms;

determining a plurality of mechanical parameters corresponding to a formation of the subsurface region of interest based, at least in part, on the plurality of time-space waveforms;

generating a filtering region based on an artifact identified in the plurality of time-space waveforms;

determining a plurality of attenuation parameters based, at least in part, on the filtering region, the plurality of attenuation parameters being configured to attenuate the artifact;

filtering the plurality of time-space waveforms based, at least in part, on the plurality of mechanical parameters and the plurality of attenuation parameters to generate a plurality of filtered time-space waveforms;

generating a seismic image of the subsurface region of interest using the plurality of filtered time-space waveforms;

determining a drilling target in the subsurface region of interest based on the seismic image;

planning, using a wellbore planning system, a planned wellbore trajectory to intersect the drilling target in the subsurface region of interest based, at least in part, on the seismic image; and instructing a drilling system to drill a wellbore guided by the planned wellbore trajectory.

8. The non-transitory computer-readable medium of claim 7, further comprising the computer-executable instructions that cause the processor to perform:

obtaining a target region from the plurality of time-space waveforms; and determining the plurality of mechanical parameters corresponding to the formation of the subsurface region of interest based, at least in part, on the target region.

9. The non-transitory computer-readable medium of claim 7, further comprising the computer-executable instructions that cause the processor to perform:

attenuating the artifact, wherein the attenuation is a function of a direction of propagation of the artifact in the filtering region, and the plurality of attenuation parameters.

10. A system comprising:

a seismic acquisition system configured to record seismic data associated with a subsurface region of interest, wherein the seismic data comprises a plurality of time-space waveforms; and a seismic processor coupled to the seismic acquisition system and configured to:

obtain the seismic data associated with the subsurface region of interest, determine a plurality of mechanical parameters corresponding to a formation of the subsurface region of interest based, at least in part, on the plurality of time-space waveforms, generate a filtering region based on an artifact identified in the plurality of time-space waveforms, determine a plurality of attenuation parameters based, at least in part, on the filtering region, the plurality of attenuation parameters being configured to attenuate the artifact, filter the plurality of time-space waveforms based, at least in part, on the plurality of mechanical parameters and the plurality of attenuation parameters to generate a plurality of filtered time-space waveforms, generate a seismic image of the subsurface region of interest using the plurality of filtered time-space waveforms, determine a drilling target in the subsurface region of interest based on the seismic image, a wellbore planning system configured to plan a planned wellbore trajectory to intersect the drilling target in the subsurface region of interest based, at least in part, on the seismic image; and a drilling system configured to drill a wellbore guided by the planned wellbore trajectory.

11. The system of claim 10, wherein the artifact is caused by a geological body.

12. The system of claim 10, wherein the artifact is caused by a geological boundary.

13. The system of claim 10, where the seismic processor is further configured to:

obtain a target region from the plurality of time-space waveforms; and determine the plurality of mechanical parameters corresponding to the formation of the subsurface region of interest based, at least in part, on the target region.

14. The system of claim 10, wherein the plurality of attenuation parameters are frequency independent.

15. The system of claim 10, wherein the filtering comprises attenuation of the artifact, the attenuation being a function of a direction of propagation of the artifact in the filtering region, and the plurality of attenuation parameters.

* * * * *